United States Patent [19]

Hageman et al.

[11] Patent Number: 4,548,674

[45] Date of Patent: Oct. 22, 1985

[54] PROCESS FOR THE REGENERATION OF WASTE PAPER

[75] Inventors: Jacques Hageman, Corbais; Liliane Meyers, Brussels, both of Belgium

[73] Assignee: Interox (Société Anonyme), Brussels, Belgium

[21] Appl. No.: 637,034

[22] Filed: Aug. 2, 1984

[30] Foreign Application Priority Data

Aug. 8, 1983 [FR] France ............................... 83 13136

[51] Int. Cl.$^4$ ................................................ D21C 5/02
[52] U.S. Cl. ............................................ 162/5; 162/6; 162/7; 162/8; 162/78
[58] Field of Search ...................... 162/4, 5, 6, 7, 8, 78

[56] References Cited

U.S. PATENT DOCUMENTS

| | | | |
|---|---|---|---|
| 3,597,309 | 8/1971 | Ashikaga et al. | 162/6 |
| 4,264,412 | 4/1981 | Hasler et al. | 162/5 |
| 4,390,395 | 6/1983 | De Ceuster et al. | 162/5 |

FOREIGN PATENT DOCUMENTS

| | | |
|---|---|---|
| 40873 | 12/1981 | European Pat. Off. |
| 288640 | 5/1914 | Fed. Rep. of Germany |
| 2016681 | 5/1970 | France |
| 1119546 | 7/1968 | United Kingdom |

OTHER PUBLICATIONS

1004 Abstract Bulletin of Inst. of Paper Chem., vol. 50, (1980) Mar., No. 9, Appleton.
Tappi, Apr. 1982, vol. 65, No. 4, Blake, "New Repulpable Adhesive Systems Must Meet Application Needs", pp. 59–63.
Schwartz et al., "Surface Active Agents", Interscience Publishers, Inc., New York, 1949, pp. vii–xi, 15–16.
Altieri et al., "Deinking of Wastepaper", Tappi Monograph Series, No. 31, 1967, pp. 49–55, 59–67.

*Primary Examiner*—William F. Smith
*Attorney, Agent, or Firm*—Spencer & Frank

[57] ABSTRACT

Waste paper containing polymeric contaminants is broken down in the presence of an acidic aqueous solution containing at least one peracid.

11 Claims, No Drawings

PROCESS FOR THE REGENERATION OF WASTE PAPER

The present invention relates to a process for the regeneration of waste paper for the purpose of recycling it.

Recovered waste paper represents a source of raw material for the paper industry. This waste paper is broken down in an aqueous phase, most frequently in a pulper, so as to give a pulp which is generally used for the manufacture of packaging paper and cardboard or newspaper. In view of the fact that the proportion of recovered fibres used in packaging products is already very high, other outlets for waste paper have also been envisaged, such as the manufacture of printing/writing paper or tissue paper. In this case, it is important to have a pulp with a sufficient degree of whiteness. A satisfactory degree of whiteness can be achieved using complementary deinking and/or bleaching treatments. Other additional treatments (retention in the vat, removal of the non-volatile and volatile impurities, centrifining, refining, and so on) are frequently included in the regeneration cycles.

The recycling of waste paper comes up against a significant obstacle, namely the presence of contaminants of polymeric type. These contaminants have in most cases been added intentionally during the actual manufacture of the paper in order to give the fibrous structures special additional properties, or during the processing of this paper. The polymeric contaminants are of various types and can be polyvinyl acetates, vinyl acetate/ethylene copolymers, waxes, styrene/butadiene latices, polystyrene, hydrocarbon resins, polyisoprenes, resin esters, butyl rubber or polyamides. They end up in specific products such as sealing tapes, adhesives used for bookbinding, coated cardboard, contact adhesives, envelopes and adhesives used for glueing cardboard.

The polymeric contaminants, and more particularly the glues or adhesives, are especially troublesome. They form agglomerates which deposit in the installations for regenerating waste paper and in the machines for manufacturing paper or cardboard. Moreover, these agglomerates detract from the final appearance of the sheet of paper or cardboard and they cause tearing when the paper is used as printing paper, in particular in rotary printing machines.

To improve the quality of the pulp produced, it has been proposed to break down the waste paper in the presence of an alkaline aqueous solution. This can contain an alkali metal hydroxide such as sodium hydroxide, if appropriate mixed with hydrogen peroxide or alternatively an alkali metal peroxide such as sodium peroxide. If necessary, the pulp obtained can be deinked by washing or by flotation.

Now, it has been found that the more thorough are the treatments for improving the whiteness of the pulp, the more pronounced is the degrading effect of the polymeric contaminants.

French Patent application No. A-2,016,681 describes a process for the recovery of a fibrous material from waste having a fibrous structure and containing a binder based on polyvinyl alcohol treated with titanic acid, wherein the waste is treated with an aqueous solution of a mineral acid containing hydrogen peroxide. In this known process, the mineral acid can be hydrochloric acid, sulphuric acid or nitric acid. However, it has been observed in practice that this known process is not satisfactory in the case of waste paper containing water-insoluble polymeric contaminants other than polyvinyl alcohol treated with titanic acid.

The object of the invention is to provide a process for the regeneration of waste paper which makes it possible to avoid the abovementioned disadvantages and, more particularly, to avoid the formation of spots of glue on the surface of the sheets of paper or cardboard in the case of waste paper containing polymeric contaminants other than polyvinyl alcohol treated with titanic acid.

For this purpose, the invention relates to a process for the regeneration of waste paper containing polymeric contaminants, which comprises pulping the waste paper in the presence of an acidic aqueous solution containing at least one peroxide compound selected from peracids.

The process is very particularly suitable for the regeneration of waste paper containing glues or adhesives.

Organic or inorganic peracids are used. Peracetic acid, perpropionic acid or perbenzoic acid can advantageously be used as the organic peracid. Good results have been obtained with peracetic acid. Permonosulphuric acid, also referred to as Caro's acid, can advantageously be used as the inorganic peracid.

During the pulping or breakdown of the waste paper, the pH at the start of breakdown is less than 7 and does not generally exceed 6.5 and preferably 6. In general, it is at least 2.5 and most frequently at least 3. Good results are obtained when the pH of the pulp at the start of breakdown is 4 to 6.

The peracid is generally used in quantities of 0.01 to 4% and most frequently of 0.05 to 2.5%, calculated as equivalents of hydrogen peroxide, relative to the weight of dry waste paper (g/100 g of solids S).

According to its acidity constant and its concentration, the peracid can be used in conjunction with another acid, a base or a buffer mixture in order to adjust the pH to the abovementioned values at the start of breakdown. Thus, if permonosulphuric acid is used, small quantities of a base, for example an alkali metal hydroxide, carbonate or silicate, are simultaneously added to the pulp. Good results have been obtained with mixtures containing permonosulphuric acid and an insufficient quantity of sodium hydroxide to neutralize all the acid.

One or more complexing agents can be introduced into the apparatus used for breaking down the waste paper. Various types of complexing agents can be used for this purpose. Thus, it is possible to use acids or salts of acids chosen from organophosphonic acids and ethylenediaminetetraacetic, diethylenediaminepentaacetic, gluconic, polyitaconic, tartaric and citric acids. These complexing agents can be used in variable quantities. In general, from 0 to 2.5 and most frequently from 0.01 to 2% of complexing agent is used, relative to the weight of dry waste paper.

It is also possible to use stabilizers for the peracid and/or other additives such as, for example, collectors and frothing agents where it is intended to carry out a deinking step by flotation, or dispersants where it is intended to carry out a deinking step by washing.

The collectors most frequently used are fatty acids or mixtures of fatty acids. The collectors can be introduced in proportions of 0 to 5% and preferably 0.01 to 4% of the weight of dry waste paper.

The frothing agents are surface-active agents and, more particularly, anionic or non-ionic surface-active agents. A list of surface-active agents is given in the work "Surface Active Agents" by A. M. Schwarz and J. W. Perry. The frothing agents can be introduced in proportions of 0 to 3% and preferably 0.01 to 2% of the weight of dry waste paper.

It is also possible to use products which simultaneously have the properties of frothing agents and those of collectors, such as, for example, sodium soaps or potassium soaps. The soaps can be introduced in proportions of 0 to 10% and preferably of 0.01 to 8% of the weight of dry waste paper.

The dispersants used in the case of deinking by washing are most frequently anionic, cationic or non-ionic surface-active agents. These include, in particular, alkyl-sulphates or aryl-sulphates, alkylsulphonates or arylsulphonates and alkyl or aryl polyether-alcohols. They are generally introduced in proportions of 0 to 5% and preferably of 0.01 to 4% of the weight of dry waste paper.

Pulping can be carried out by breaking down the waste paper using a variety of techniques known per se. Various apparatuses suitable for this purpose can be used. Thus, it is possible to use grinders operating at a high pulp consistency. Examples of apparatuses of this type are described in Tappi Monograph Series No. 31, 1967, Deinking Waste Paper. Good results have been obtained in pulpers. The consistency of the pulps can vary within wide limits according to the type of apparatus used. In general, it is between 1 to 50% and preferably 1 to 35%. In a pulper, pulp consistencies of between 1 and 15% and preferably 1 and 10% are generally used.

The temperature in the apparatus used for breaking down the waste paper is normally between 20° and 130° C. If the operation is carried out in a pulper, temperatures of at least 30° C. and most frequently of at least 45° C. are generally used; in this case, the temperature does not generally exceed 90° C. and most frequently 85° C. The residence time in the breakdown apparatus can vary within wide limits according to the type of apparatus used. It is normally between 30 seconds and 3 hours. In a pulper, it is generally between 5 and 120 minutes.

The breakdown of the waste paper can be preceded by one or more other steps such as grinding or impregnation, and can be followed by one or more other steps such as additional breakdown, dispersion, purification, bleaching, retention in the vat, centrifining, thickening, dilution or deinking by flotation or by washing, the number of steps and the order in which they succeed one another depending on the types of waste paper and on the final whiteness desired. Good results have been obtained when the breakdown is followed by a step for removing the inks by flotation. In this case, the pulp can be rendered alkaline beforehand so that the flotation takes place at a pH of more than 7. The pH of the pulp is generally 7 to 10 during the flotation and, more particularly, at the start of flotation. It is most frequently equal to about 9 at the start of flotation. For this purpose, various compounds of alkaline type are added to the pulp before flotation. Good results have been obtained with the hydroxide, carbonate or silicate of an alkali metal such as sodium. The flotation is carried out at temperatures and pulp consistencies which are well known per se. In general, the temperature is 10° to 60° C. and most frequently 15° to 50° C. and the pulp consistency is 0.1 to 5% and most frequently 0.2 to 3%.

A suitable process consists in breaking down the waste paper by the process according to the invention, if appropriate after preliminary treatments such as grinding or impregnation, and then in subjecting the resulting pulp, if appropriate after centrifining, to deinking by flotation at alkaline pH.

The process according to the invention makes it possible to avoid the formation of agglomerates in the installations for regenerating waste paper, and more particularly in the pipes, as well as in the installations for the manufacture of paper and cardboard from recycled pulp, and more particularly on the cloths, felts, pressure rollers and drying rolls. Moreover, it makes it possible to avoid the formation of spots of glue on the sheets of paper. The process also makes it possible to remove the silicone-treated backing of recycled waste paper originating from self-adhesive labels. Finally, it makes it possible to improve the whiteness and reduce the breakdown time.

Practical examples are given below in order to illustrate the invention without thereby restricting its scope.

EXAMPLES

The experiments were carried out in a pulper and in a laboratory flotation cell.

The pulper or breaker conforms to that described in French Standard Q-50-002. The working consistency is 5% and the duration is 40 minutes.

The flotation cell has a capacity of 20 liters and is of the VOITH type.

The experiments were carried out on a mixture containing 80% of newspapers and magazines in a ratio of 6:4 and 20% of adhesive tapes and their silicone-treated backing.

The whiteness of the waste paper broken down in water is equal to 49.7% relative to the whiteness of $BaSO_4$, measured by means of an ELREPHO reflectometer (ZEISS) equipped with the R 457 filter and a gloss trap (ISO Standard 2470).

The paper is shredded by hand before being introduced into the pulper. The aqueous solution containing all the reagents except the peracid is then added.

The hardness of the water used to obtain the pulp is 10 degrees on the German scale. The mixture is brought to a temperature of about 50° C. and mixed for one minute before the peracid is introduced.

The pulp withdrawn from the pulper is diluted to a consistency of about 0.8% and treated in the flotation cell at about 40°–44° C. If necessary, the pulp has been rendered alkaline beforehand by the addition of sodium hydroxide so that the pH of the pulp is equal to about 9 at the start of flotation. After 15 minutes of flotation, a sample is taken to measure the whiteness.

Two experiments for breaking down waste paper were carried out by way of comparison with, respectively, an alkaline solution of hydrogen peroxide (Experiment 1 R) and an acidic solution free of peracid (Experiment 2 R).

Two experiments were carried out according to the invention in the presence of, respectively, an acidic solution of persulphuric acid (Experiment 3) and an acidic solution of peracetic acid (Experiment 4).

The operating conditions and the results obtained are collated in Table I below.

TABLE I

| EXPERIMENT | 1R | 2R | 3 | 4 |
|---|---|---|---|---|
| Pulper | | | | |

TABLE I-continued

| EXPERIMENT | 1R | 2R | 3 | 4 |
|---|---|---|---|---|
| Additives | | | | |
| $H_2O_2$, g/100 g of S | 0.5**** | — | — | — |
| sulphuric acid, g/100 g of S | — | 0.32 | — | — |
| persulphuric acid, g/100 g of S | — | — | 1.78**** | — |
| peracetic acid*, cm³/100 g of S | — | — | — | 2.15**** |
| NaOH, g/100 g of S | 1.0 | — | 3.22 | — |
| sodium silicate**, g/100 g of S | 3.0 | — | — | — |
| collector***, g/100 g of S | 1.0 | 1.0 | 1.0 | 1.0 |
| pH of introduction | 10.6 | 4.5 | 4.5 | 4.5 |
| Flotation cell | | | | |
| Additives | — | — | 1.25 | 1.25 |
| NaOH, g/100 g of S | | | | |
| Initial pH | 9.2 | 8.9 | 8.9 | 8.9 |
| Whiteness | 60.8 | 53.7 | 57.2 | 57.7 |
| Spots of glue | partial elimination | substantial elimination | total elimination | almost total elimination. The rare agglomerates no longer have any stickiness. |

*equilibrium solution containing 378.5 g/liter of peracetic acid and 63.2 g/liter of hydrogen peroxide
**38° Baumé ($Na_2O.3.3SiO_2$)
***SERFAX MT90 (biodegradable anionic sodium surface-active agent)
****equivalent to 0.235% of active oxygen

We claim:

1. A process of the degradation of polymeric contaminants in waste paper comprising pulping the waste paper in an acidic aqueous solution containing at least one peroxide compound in an amount sufficient to substantially degrade said polymeric contaminants selected from among organic and inorganic peracids at a pH of from about 2.5 to about 6.5.

2. The process according to claim 1, wherein the peroxide compound is permonosulphuric acid.

3. The process according to claim 1, wherein the peroxide compound is peracetic acid.

4. The process according to claim 1, wherein the aqueous solution has a pH of between 3 and 6.

5. The process according to claim 4, wherein the aqueous solution has a pH of between 4 and 6.

6. The process according to claim 1, wherein the proportion of the peroxide compound is 0.01 to 4% by weight, calculated as equivalents of hydrogen peroxide, relative to the weight of dry waste paper.

7. The process according to claim 6, wherein the peroxide compound is 0.05 to 2.5% by weight.

8. The process according to claim 1, conducted at a temperature of 30° to 85° C.

9. The process according to claim 1, wherein the waste paper is pulped in a pulper to a pulp consistency of 1 to 15%.

10. The process according to claim 1, wherein, in a second step, the pulped waste paper is deinked by flotation.

11. The process according to claim 10, wherein flotation is carried out at an alkaline pH.

* * * * *